United States Patent [19]

Hoshiba et al.

[11] Patent Number: 5,197,430
[45] Date of Patent: Mar. 30, 1993

[54] IGNITION CONTROL DEVICE FOR INTERNAL COMBUSTION ENGINE

[75] Inventors: Akihiko Hoshiba; Hitoshi Motose, both of Hamamatsu, Japan

[73] Assignee: Sanshin Kogyo Kabushiki Kaisha, Hamamatsu, Japan

[21] Appl. No.: 822,174

[22] Filed: Jan. 16, 1992

[30] Foreign Application Priority Data

Jan. 17, 1991 [JP] Japan .................................. 3-16966

[51] Int. Cl.⁵ .............................................. F02P 5/15
[52] U.S. Cl. ..................................... 123/421; 123/424
[58] Field of Search ............. 123/417, 421, 424, 179.5

[56] References Cited

U.S. PATENT DOCUMENTS

| | | | |
|---|---|---|---|
| 4,416,234 | 11/1983 | Ikeura | 123/424 |
| 4,570,596 | 2/1986 | Sato | 123/421 |
| 4,982,712 | 1/1991 | Abe | 123/424 |
| 4,998,521 | 3/1991 | Inoue et al. | 123/424 |
| 5,027,771 | 7/1991 | Daikoku et al. | 123/421 |
| 5,080,067 | 1/1992 | Nakamura | 123/421 |

*Primary Examiner*—Willis R. Wolfe
*Attorney, Agent, or Firm*—Ernest A. Beutler

[57] ABSTRACT

A temperature compensated ignition control device for advancing ignition timing during low temperature operation of the engine wherein the temperature sensor may be mounted at any number of locations as long as the temperature it senses at the start of the engine is the same as the actual temperature at the time of engine starting. The ignition advance is determined based on the temperature sensed at the start of the engine and a preprogrammed relationship between the sensed temperature where the sensor is located and the actual engine temperature at predetermined time periods after the start of the engine and igniton timing control characteristics.

4 Claims, 8 Drawing Sheets

IGNITION CONTROL DEVICE FOR INTERNAL COMBUSTION ENGINE

BACKGROUND OF THE INVENTION

This invention relates to an ignition control device for an internal combustion engine, and more particularly to an improved electronic ignition control device which includes a spark advance control circuit operating in connection with a temperature sensor that may be mounted at any number of locations on or near the engine to provide temperature responsive advance of the ignition timing during low temperature operation of the engine after it is started.

It is well known that a wide variety of internal combustion engines are now provided with electronic ignition control. The use of electronic circuitry permits a wider adjustment of ignition timing to suit a variety of different operating conditions. For example, it has been proposed to employ an engine temperature sensor in combination with the logic of the ignition timing circuitry in order to provide additional spark advance during low temperature starting. These devices have typically included a temperature sensor that is mounted on the cylinder head or on the cylinder block of the engine to effect real time control of the spark advance and to suppress any unnecessary increase in idling engine speed during warm-up. While the mounting of the temperature sensor in proximity to the combustion chamber allows real time control of the spark advance, it has a disadvantage in that the mounting location of the temperature sensor is very limited. On the other hand, when a temperature sensor is located at a position remote from the combustion chamber, real time control of the spark advance has not been adequately achieved.

It is, therefore, a principal object of this invention to provide an ignition control device for an internal combustion engine which includes a spark advance control circuit and a temperature sensor that may be mounted at any number of locations on or in proximity to the engine to achieve temperature responsive spark advance.

It is a further object of this invention to provide an ignition control device for an internal combustion engine including a spark advance control circuit in combination with a temperature sensor which may be arranged advantageously from the standpoint of design, space occupation and cost.

SUMMARY OF THE INVENTION

A first embodiment of the invention is adapted to be embodied in an electronic ignition control device for an internal combustion engine that is comprised of a spark advance control circuit for controlling the ignition timing of the engine during low temperature operation after the start of the engine. A temperature sensor is provided for sensing temperature at the start of the engine and transmitting a signal to the control circuit which is indicative of the sensed temperature at the start of the engine. The spark advance control circuit includes a memory and a central processing unit which computes optimum ignition timing after the start of the engine during low temperature operation of the engine based on the temperature sensed only at the start of the engine by the temperature sensor and a pre-programmed relationship that is stored in the memory between the sensed temperature where the temperature sensor is located and the actual temperature of the engine at predetermined time periods after the start of the engine and ignition timing control characteristics.

Another embodiment of the invention is adapted to be embodied in a method for controlling ignition timing in an internal combustion engine during low temperature operation after the start of the engine. The method comprises the steps of sensing temperature with a temperature sensor at the start of the engine, transmitting a signal to a spark advance control circuit indicative of the sensed temperature at the start of the engine, and determining optimum ignition timing after the start of the engine during low temperature operation of the engine based on the sensed temperature at the start of the engine and a preprogrammed relationship stored in a memory of the spark advance control circuit between the sensed temperature where the sensor is located and the actual engine temperature at predetermined time periods after the start of the engine and ignition timing control characteristics.

BRIEF DESCRIPTION OF THE DRAWINGS

FIG. 6 (a) illustrates a graph showing the advanced ignition timings prior to completion of warm-up based on engine temperature measured at the time of starting and engine temperatures between starting and warm-up which are determined from the program in memory.

FIG. 6 (b) is a graph showing the duration of the time periods A or B depicted in FIG. 6 (a) relative to the engine temperature at the time of starting.

FIG. 7 (a) is a graph illustrating the advanced ignition timings immediately following the start of the engine until completion of warm-up which are based on engine temperature determined at the time of starting and engine temperatures between starting and warm-up which are determined from the program in memory.

FIGS. 7 (b) and 7 (c) are graphs which depict the duration of the time periods A and B respectively in relation to the engine temperature at the start thereof.

FIGS. 8 (a) and 8 (b) show another ignition timing advance control strategy in accordance with the invention between start of the engine and completion of warm-up based on temperature.

FIGS. 9 (a) and 9 (b) illustrate still another spark advance control strategy between start of the engine and completion of warm-up based on temperature in accordance with the invention.

DETAILED DESCRIPTION OF THE PREFERRED EMBODIMENT OF THE INVENTION

Figure 1:
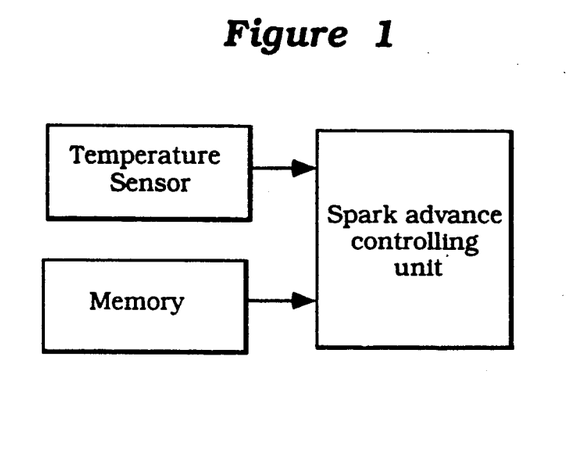
FIG. 1 is a schematic illustration of the operation of the invention wherein the spark advance control unit performs spark advance based on a signal from the temperature sensor and data stored in memory relating the sensed temperatures where the temperature sensor is positioned and the actual engine temperatures after the start of the engine and ignition timing control characteristics.

The basic operation of the invention is shown schematically in FIG. 1. The spark advance control unit or circuit controls the ignition timing of the engine during low temperature operation after the start of the engine based on a temperature signal received from a temperature sensor and on temperature data and ignition timing control characteristics stored in a memory as hereinafter described.

Figure 2:
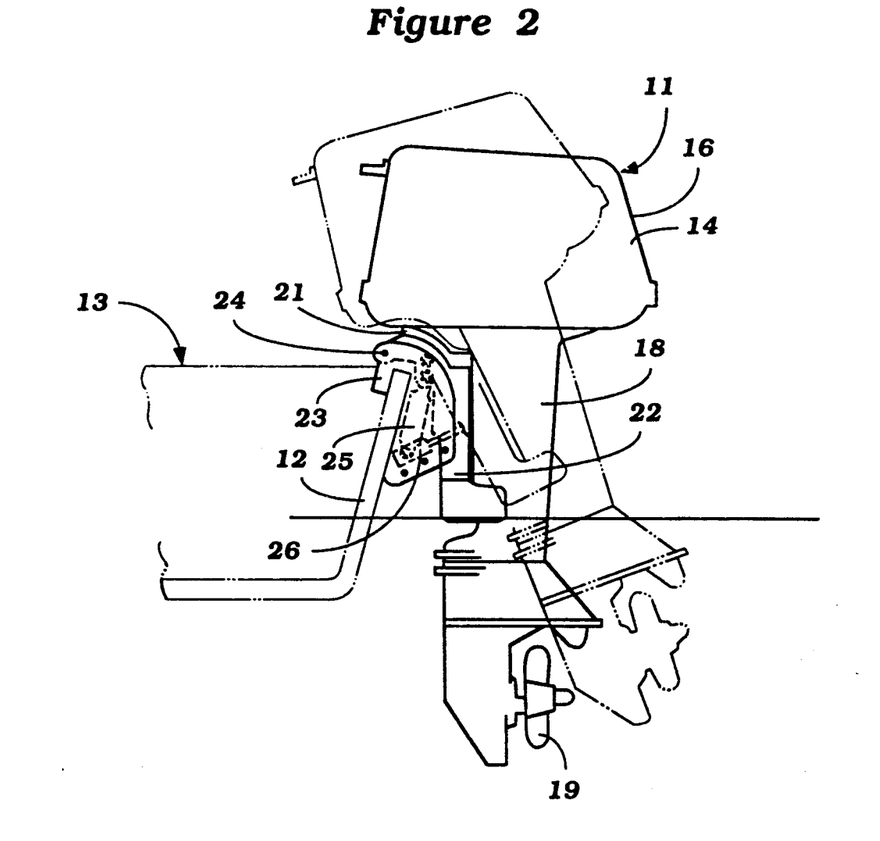
FIG. 2 is a side elevational view of an outboard motor, attached to the transom of an associated watercraft, shown in the tilted down position in solid lines and in a partially tilted up position in phantom, and illustrating the environment in which the invention may be practiced.

Referring now to FIG. 2, an outboard drive unit in the form of an outboard motor constructed in accordance with an embodiment of the invention is identified by the reference numeral 11. The outboard motor 11 is mounted on a transom 12 of a hull of an associated watercraft 13. The outboard motor 11 is comprised of a power head 14 which includes an internal combustion engine 15 (see FIG. 3) which is, in the illustrated embodiment, of the three cylinder, in-line, spark ignited, two cycle type. It is to be understood, however, that the invention can also be utilized in conjunction with types of spark ignited internal combustion engines other than the in-line or two cycle type. Moreover, although the invention is described in connection with an outboard drive unit, it is not so limited and may also be practiced outside the marine environment. The invention, however, has particular utility in connection with an outboard drive unit.

The power further includes a protective cowling 16 that surrounds and protects the engine 15.

The engine 15 has an output shaft 17 (see FIG. 3) that drives a driveshaft journaled for rotation within a driveshaft housing 18. The driveshaft, in turn, drives a propeller 19 of a lower unit through a conventional forward, neutral, reverse transmission (not shown).

A steering shaft 21 is affixed to the driveshaft housing 18 and is journaled within a swivel bracket 22 for steering of the outboard motor 11 about a generally vertically extending steering axis. The swivel bracket 22 is, in turn, connected for pivotal movement to a clamp bracket 23 by means of a pivot pin 24 for tilt and trim adjustment of the outboard motor 11. A clamping mechanism is carried by the clamp bracket 23 for affixing the outboard motor 11 to the transom 12 of the associated watercraft 13. Tilt and trim linear fluid motors 25 and 26, respectively, are interconnected between the swivel bracket 22 and clamp bracket 23 to effect such tilt and trim adjustment of the outboard motor 11.

The construction of the outboard motor 11 as thus far described may be considered to be conventional and since the invention deals with the engine 15 and its ignition system, further description of the outboard motor 11 is not believed to be necessary to understand the construction and operation of the invention.

Figure 3:
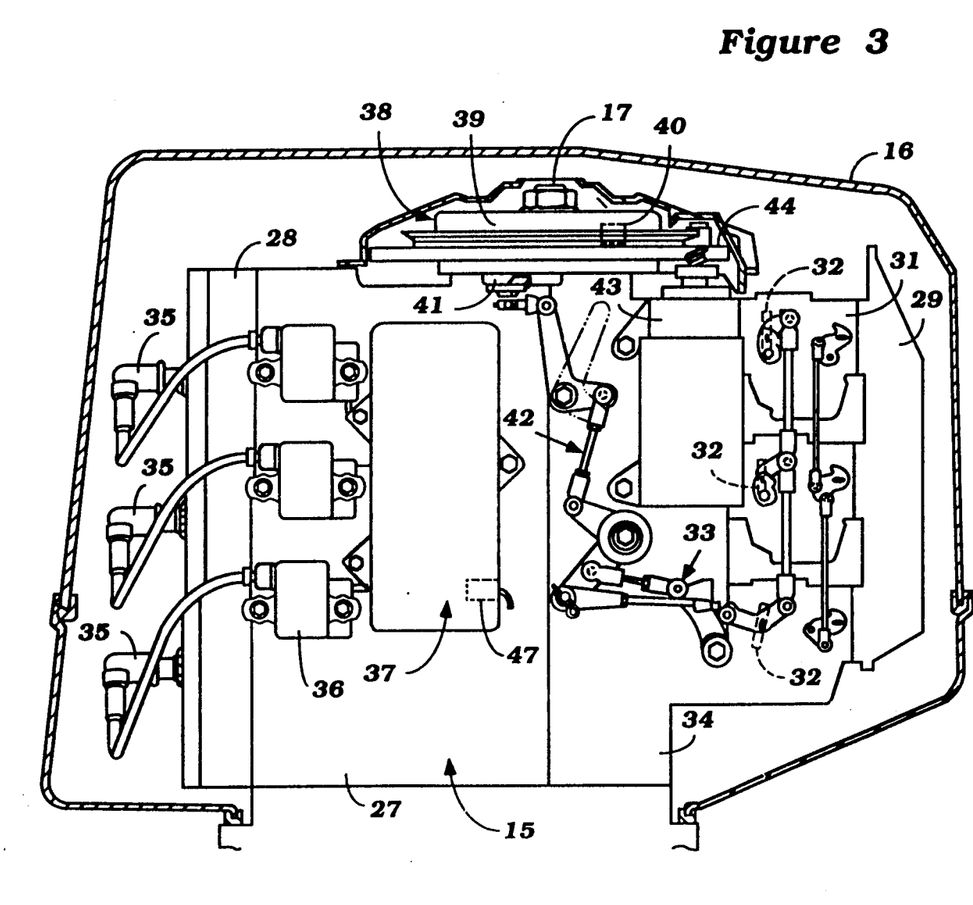
FIG. 3 is an enlarged side elevational view of the power head of the outboard motor showing the ignition control device of the invention.

Referring now to FIG. 3, the engine 15, as previously noted, is of the three cylinder, in-line, two cycle type and is comprised of a cylinder block 27 to which a cylinder head 28 is affixed in a known manner. The engine 15 is provided with an induction system that includes an air inlet device 29 that draws air in from the interior of the cowling 16 and delivers the air to a plurality of carburetors 31. The carburetors 31 have respective throttle valves 32 which are interconnected by means of a throttle linkage that is operated by means including a throttle control link 33. The carburetors 31 supply a mixture of fuel and air to the engine 15 and specifically to the individual crank chambers formed in the crankcase 34 wherein the crankshaft 17 is journaled for rotation.

A spark plug 35 is provided for each cylinder of the engine 15, these being mounted in the cylinder head 28 in a known manner. The spark plugs 35 are fired by means of individual ignition coils 36, one associated with each spark plug 35, which are charged and triggered by means of an electronic ignition control device that includes a CDI unit indicated generally by the reference numeral 37. The CDI unit 37 has a spark advance control circuit for controlling the ignition timing and firing of the spark plugs 35 during low temperature operation after the start of the engine 15 as hereinafter described.

The firing power for the spark plugs 35 is derived from a magneto generator assembly, indicated generally by the reference numeral 38, which is driven by the engine 15 and includes a flywheel that is affixed to the upper end of the engine output shaft 17 by means of a nut and key (not shown). The magneto generator 38 includes a rotor 39 which carries in its interior one or more permanent magnets (not shown) that cooperate with a generating coil that is affixed to the cylinder block 27 in proximity to the permanent magnets. A pulser coil 40 is mounted inside the rotor 39 and cooperates with the permanent magnets so as to provide signals when the crankshaft 17 is at specified crank angles. A sliding timing plate 41 is rotatably mounted on a cylindrical portion of an upper part of the engine 15 and is angularly adjusted by means of a timing control linkage 42 that is connected to the throttle control link 33 for adjusting the timing in response to the position of the throttle valves 32 and engine speed, as is well known.

The engine 15 is also provided with an electric starter motor 43 that is mounted on the side wall of the crankcase 34 and has a starter gear with teeth that are enmeshed with the teeth of a corresponding ring gear 44 formed on the flywheel for starting the engine 15 in a known manner.

Figure 4:
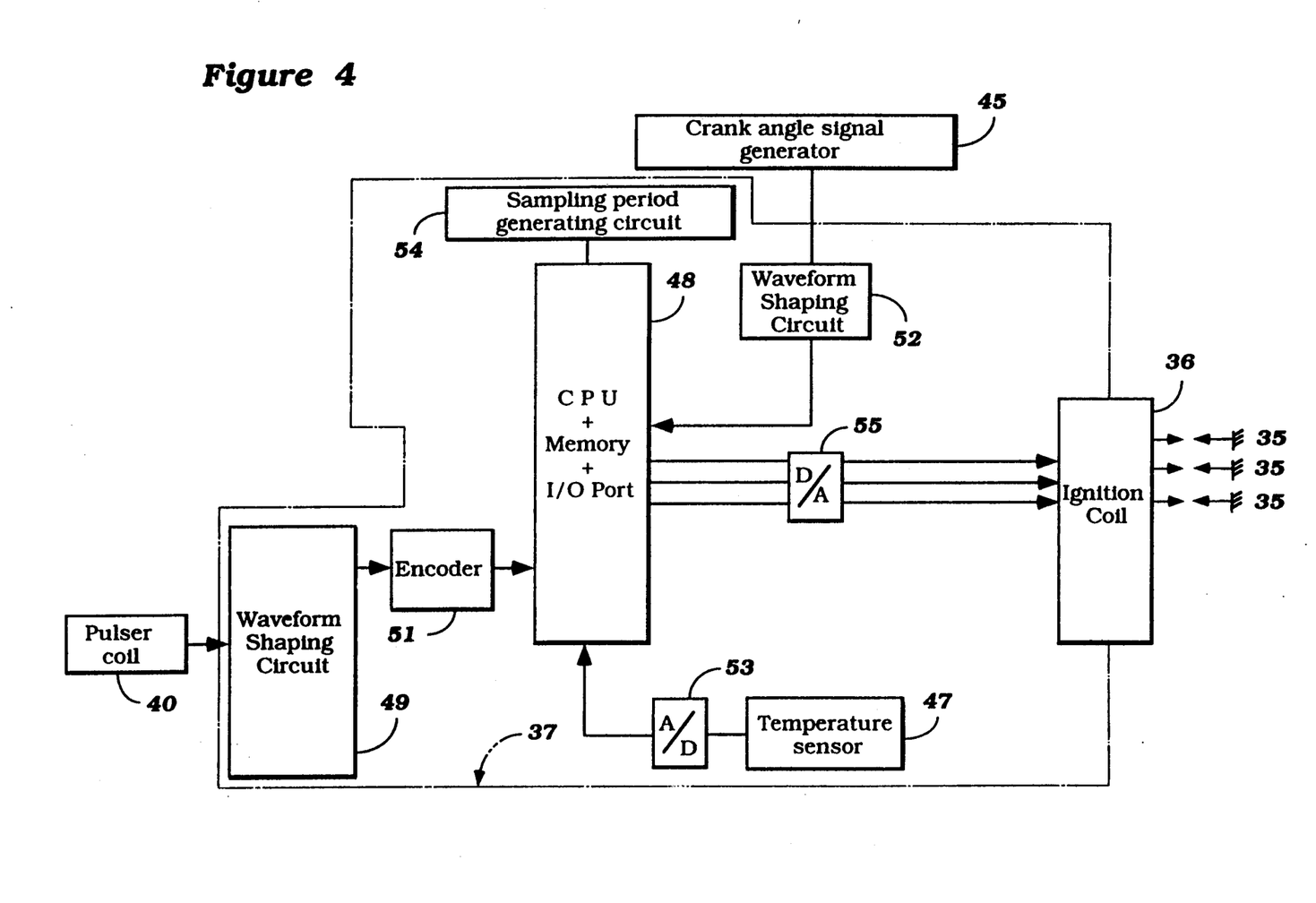
FIG. 4 is a block diagram showing the operation of the capacitor discharge ignition (CDI) unit which controls the ignition timing of the engine during low temperature operation after starting.

Referring now to FIG. 4, in addition to FIG. 3, the ignition control device includes a crank angle signal generator 45 that is affixed on the engine 15 at a position opposite the outer periphery of the ring gear 44. The crank angle signal generator 45 is adapted to induce pulses corresponding to the meshing teeth of the ring gear 44 upon rotation of the crankshaft 17. The pulser coil 40, which is positioned inside the rotor 39 as previously noted, is in circuit with the spark advance control circuit of the CDI unit 37. The pulser coil 40 is adapted to generate, every revolution of the crankshaft 17, a predetermined number of pulses corresponding to a predetermined angle of the crankshaft 17, and in this manner serves to function as a reference crank angle signal generator. Thus, the angular position of the crankshaft 17 may be detected by calculating the number of pulses generated by the crank angle signal generator 45 after counting the number of pulses that have been generated by the pulser coil 40.

In addition, the pulser coil 40 also functions as an engine speed sensor. That is, since the pulser coil 40 generates a predetermined number of pulses per revolution of the crankshaft 17, the revolution speed of the crankshaft 17 and hence the engine speed can be detected by counting the pulses generated by the pulser coil 40 in a given period of time.

In accordance with the invention, a temperature sensor 47, of the thermistor type, is provided for detecting the temperature of the engine 15 at the start thereof. In the illustrated embodiment, the temperature sensor 47 is mounted in the CDI unit 37; however, the sensor 47 is not limited to such a location, and may be located at any number of locations as long as the temperature it senses is the same as the temperature of the engine 15 at the start thereof.

FIG. 4 is a block diagram showing the construction of the CDI unit 37 which controls the ignition timing during low temperature operation of the outboard motor 11. The CDI unit 37 is formed with a central processing unit (CPU), a memory and an input/output (I/O) port, indicated collectively by the reference numeral 48. In operation, after the engine 15 is started, pulse signals from the pulser coil 40 functioning as an engine speed sensor and a reference crank angle signal generator are transmitted to a waveform shaping circuit 49. The shaped wave is then inputted to the memory of the CDI unit 37 through an encoder 51. Pulse signals from the crank angle signal generator 45 are also transmitted to the memory after being shaped in a waveform shaping circuit 52 for determining the angular position of the crankshaft 17. A signal from the temperature sensor 47 is also inputted to the memory after the analog signal produced by the sensor 47 is digitized in an A/D converter 53. A sampling period generating circuit, indicated by the reference numeral 54, is in circuit with the CPU and memory 48 and is provided to monitor the time.

From the inputted data, that is from the signals received from the pulser coil 40, the crank angle signal generator 45 and the temperature sensor 47, the CPU 48 computes an optimum ignition timing during low temperature operation of the engine 15 between the start of the engine 15 and completion of its warm-up. This calculated ignition timing is then converted from a digital signal into an analog signal in a D/A converter 55 and is transmitted to the ignition coils 36 for generating a high voltage in the coils 36 to fire the spark plugs 35 at the calculated times.

Figure 5:
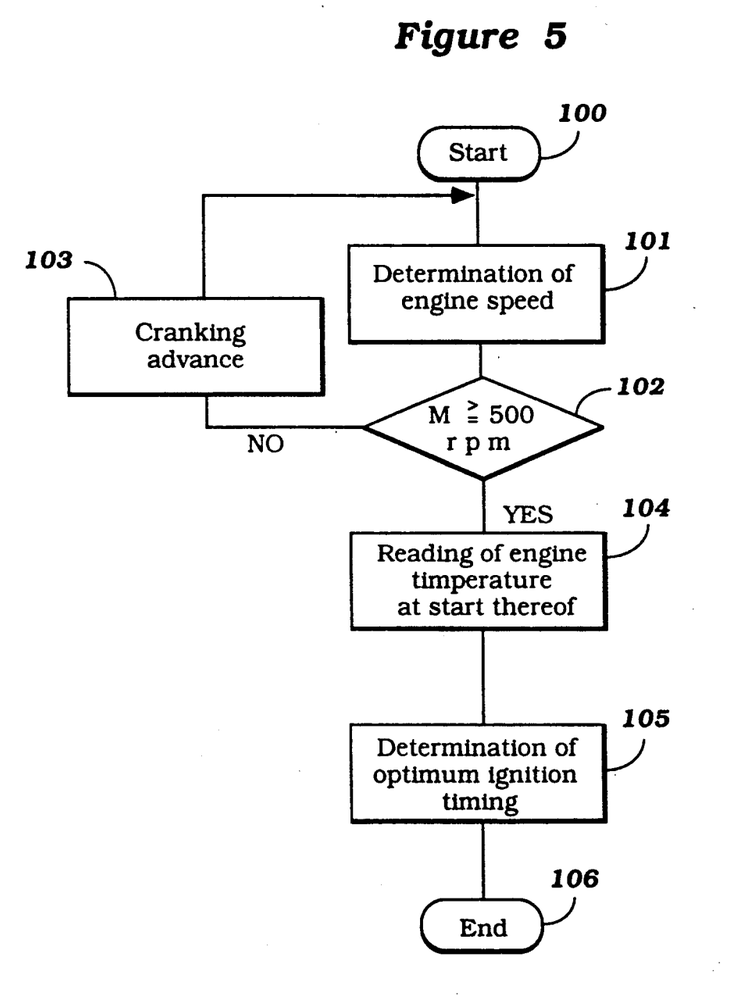
FIG. 5 is a flow chart showing the steps in the determination of optimum ignition timing.

The determination of the optimum ignition timing in the CPU will now be explained with reference to the flow chart of FIG. 5. After the engine 15 is started in step 100, the engine speed is determined on the basis of the number of pulses generated from the pulser coil 40 per unit time period in step 101. In the next step 102 it is determined whether or not the engine speed is greater than or equal to 500 rpm. If the engine speed is less than 500 rpm, the ignition timing is set at 5. BTDC in step 103 after which the program returns to step 101. If, on the other hand, the engine speed is determined to be greater than or equal to 500 rpm in step 102, the program then proceeds to step 104 where the temperature signal from the temperature sensor 47 is read at the start of the engine 15. In step 105, an optimum ignition timing during low temperature operation after the start of the engine is determined on the basis of the temperature sensed at the start of the engine 15 and on the basis of temperature data and spark advance characteristics which have previously been stored in the memory 48.

Figure 6A:
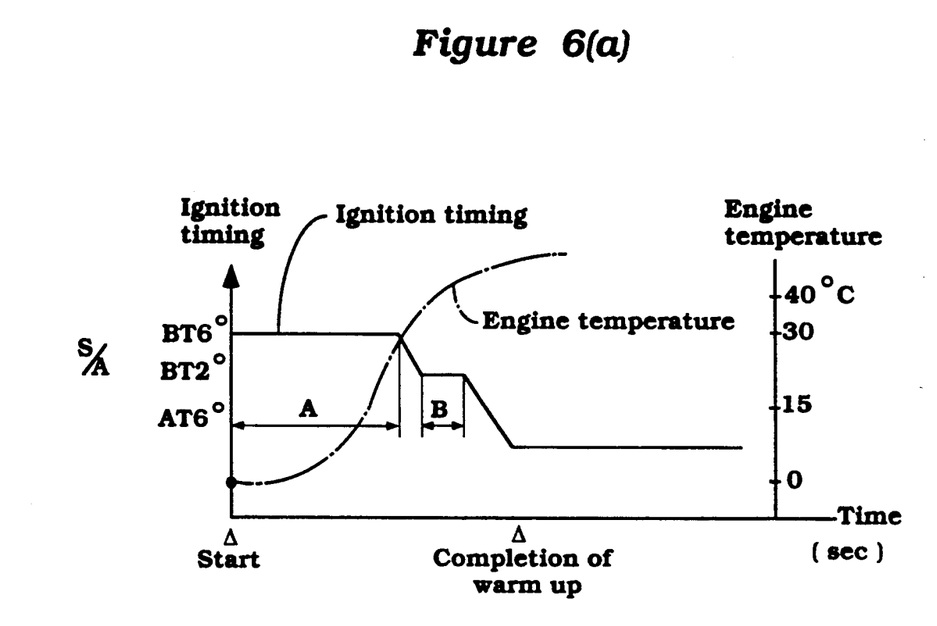
Figure 6B:
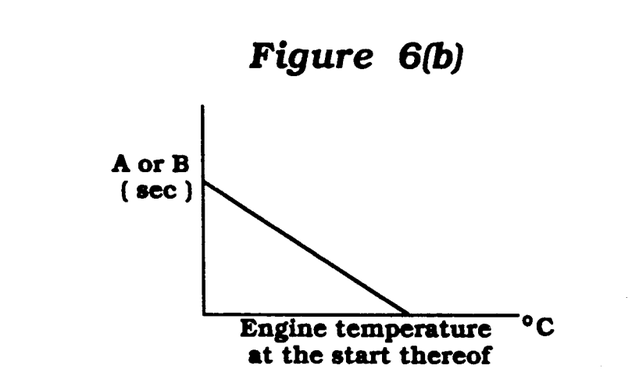

In this determination of optimum ignition timing, reference is made to the ignition timing control characteristics after the start of the engine 15 which are illustrated in FIGS. 6(a) and (b) and which have been stored in memory 48. These characteristics shown in FIGS. 6(a) and 6(b) are given by way of example.

As shown in FIG. 6(a), after the start of the engine 15, the ignition timing is first advanced for a time period designated by "A" until the engine temperature reaches a predetermined value and is then controlled in multiple steps so as to gradually retard the timing until warm-up is completed. The time periods "A" and "B" during which the ignition timing is held at a constant spark advance are stored in memory 48 and are calculated on the basis of the temperature of the engine 15 when it is started, as illustrated in FIG. 6(b), and also in connection with a set of correlated temperature values predetermined by experimental results in the design and development of the system and preprogrammed in the memory 48 relating the temperature where the sensor 47 is located to the actual engine temperature at given time periods after the engine 15 is started. The memory 48 may be loaded with a number of sets of correlated temperature values for different sensor locations.

The temperature sensor 47 used to determine the temperature of the engine 15 at the time of starting may be located at any one of a variety of locations and is not limited to a particular location as long as the temperature it senses at the start of the engine 15 is the same as the actual starting temperature of the engine 15. However, in accordance with the invention, the temperature at the location of the sensor 47 at any given time after the start of the engine 15 need not be the same as the actual temperature of the engine 15 at that particular time.

Once the engine starting temperature is sensed, this temperature is inputted to the CPU 48 where it is used in connection with a particular set of preprogrammed correlated temperature values specific for that engine starting temperature and sensor location. From this information, which enables the actual engine temperature relative to a particular time after the engine 15 is started to be determined, the time periods "A" and "B" may be calculated.

Figure 7A:
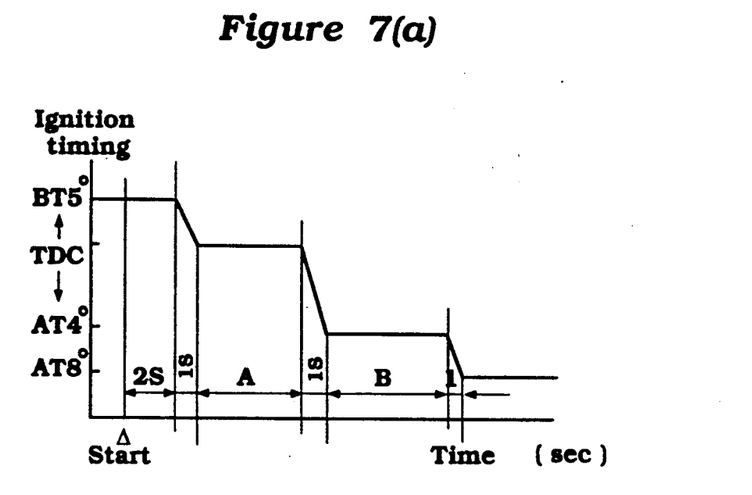
Figure 7B:
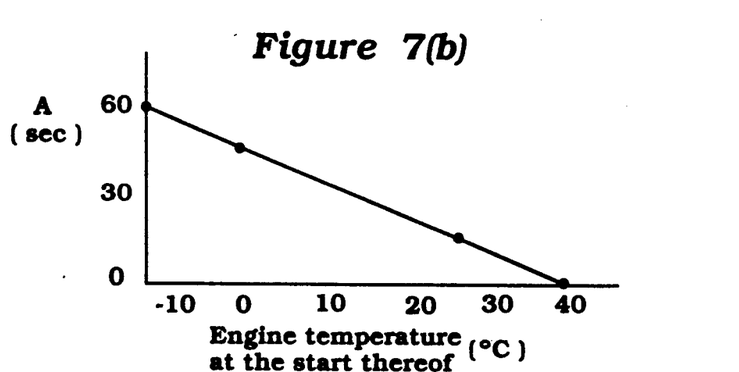
Figure 7C:
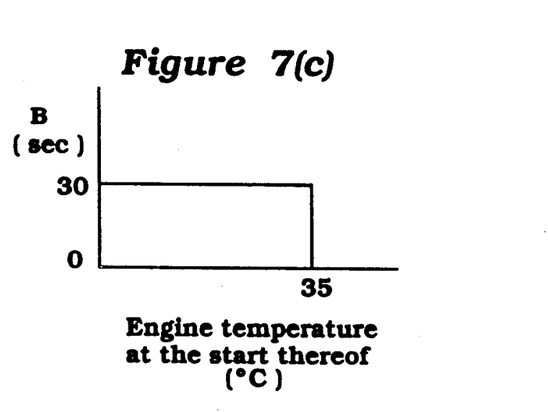

The ignition control characteristics after the start of the engine 15 are not limited to those shown in FIGS. 6(a) and 6(b). FIGS. 7(a), 7(b) and 7(c) show different ignition control characteristics. As in the control strategy illustrated in FIGS. 6(a) and 6(b), the duration times A and B of the constant spark advance are determined on the basis of the temperature at the start of the engine 15, as shown in FIGS. 7(b) and 7(c) respectively, as well as in connection with a set of preprogrammed correlated temperature values relating the temperature where the sensor 47 is located to the actual engine temperature at given time periods after the engine 15 is started.

Figure 8A:
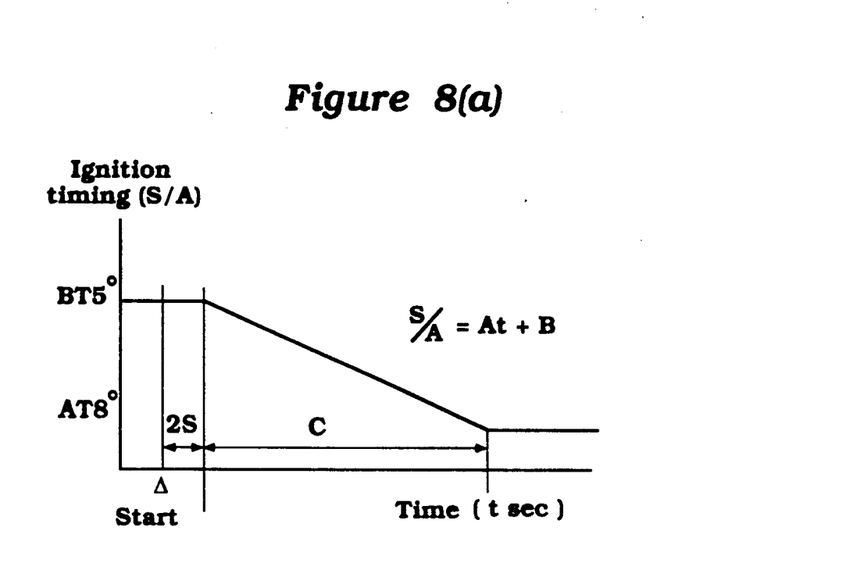
Figure 8B:
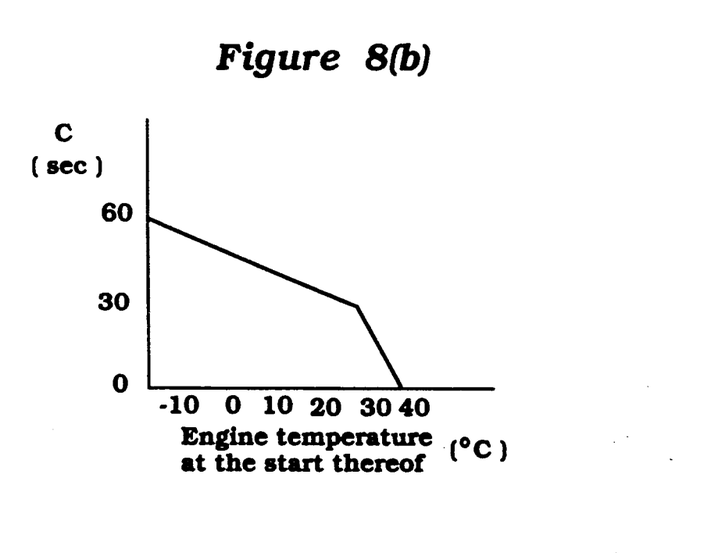

Instead of the multiple step control of the ignition timing as shown in FIGS. 6 and 7, linear control of the ignition timing after the start of the engine 15 may be employed, as illustrated in FIGS. 8(a) and 8(b). In this strategy, A, B and C are determined on the basis of engine temperature at the start thereof as shown in FIG. 8(b), and on preprogrammed temperature data as previously described in connection with FIGS. 6 and 7.

Figure 9A:
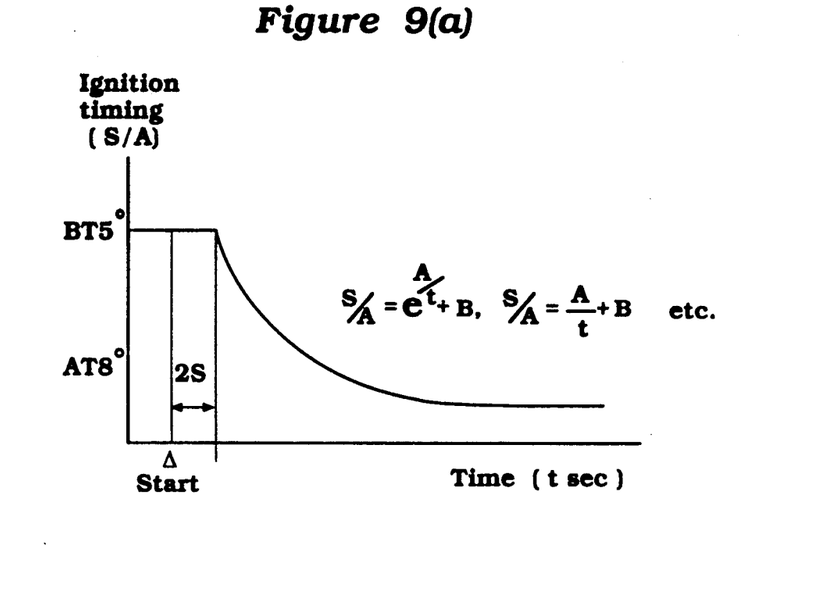
Figure 9B:
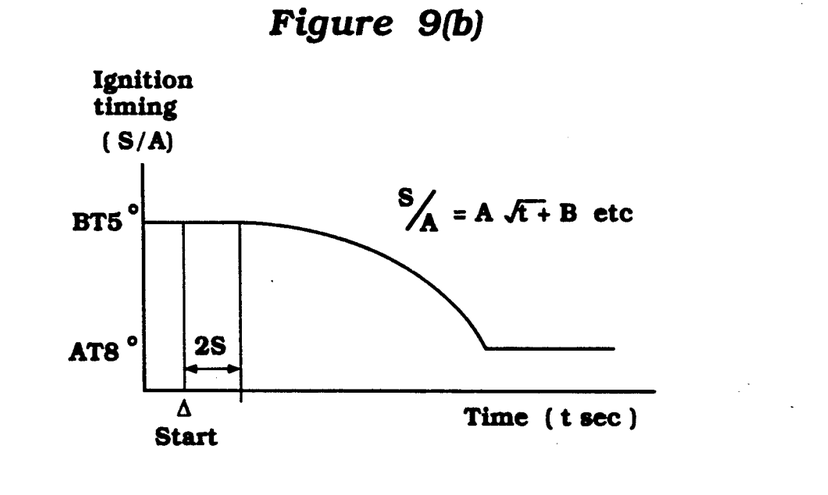

Ignition timing control characteristics which change curvilinearly may also be used and this control strategy is shown in FIGS. 9(a) and 9(b). Here, A and B are determined in the manner as previously described.

It should be readily apparent from the foregoing description that a very effective temperature adjusted ignition timing control system is provided which enables the temperature sensor of the system to be located in a variety of locations without affecting the operation of the system. Although an embodiment and various control strategies have been illustrated and described, various changes and modifications may be made without departing from the spirit and scope of the invention, as defined by the appended claims.

We claim:

1. An electronic ignition control device for an internal combustion engine comprising a spark advance control circuit for controlling the ignition timing of the engine during low temperature operation after the start of the engine, a temperature sensor for sensing temperature at the start of the engine and transmitting a signal to said control circuit indicative of the sensed temperature at the start of the engine, said control circuit including a central processing unit and a memory wherein the central processing unit computes optimum ignition timing after the start of the engine during low temperature operation of the engine based on the temperature sensed only at the start of the engine and a preprogrammed relationship stored in the memory between the sensed temperature where the temperature sensor is located and the actual temperature of the engine at predetermined time periods after the start of the engine and ignition timing control characteristics.

2. An electronic ignition control device as recited in claim 1, wherein said temperature sensor is located so that the temperature it senses at the start of the engine is substantially the same as the temperature of the engine at the start of the engine.

3. A method for controlling ignition timing in an internal combustion engine during low temperature operation after the start of the engine, comprising the steps of sensing temperature with a temperature sensor at the start of the engine, transmitting a signal to a spark advance control circuit indicative of the sensed temperature at the start of the engine, determining optimum ignition timing after the start of the engine during low temperature operation of the engine based on the sensed temperature at the start of the engine and a preprogrammed relationship stored in a memory of the spark advance control circuit between the sensed temperature where the sensor is located and the actual engine temperature at predetermined time periods after the start of the engine and ignition timing control characteristics.

4. A method for controlling ignition timing as recited in claim 3, wherein the temperature sensor is located so that the temperature it senses at the start of the engine is substantially the same as the temperature of the engine at the start of the engine.

* * * * *